G. TOLLEFSON.
RUNNER ATTACHMENT FOR MOTOR DRIVEN VEHICLES.
APPLICATION FILED MAR. 9, 1918.
1,275,797. Patented Aug. 13, 1918.
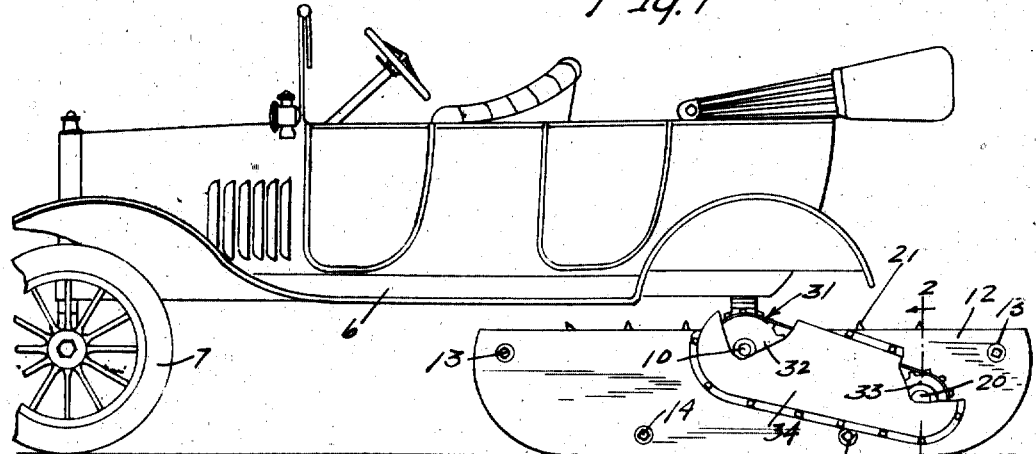
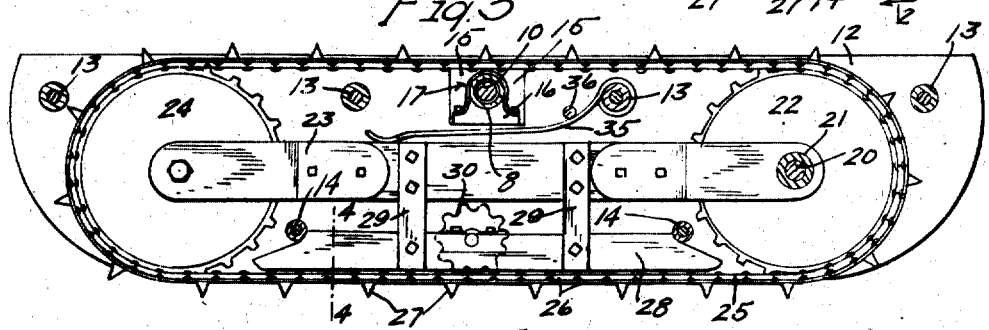
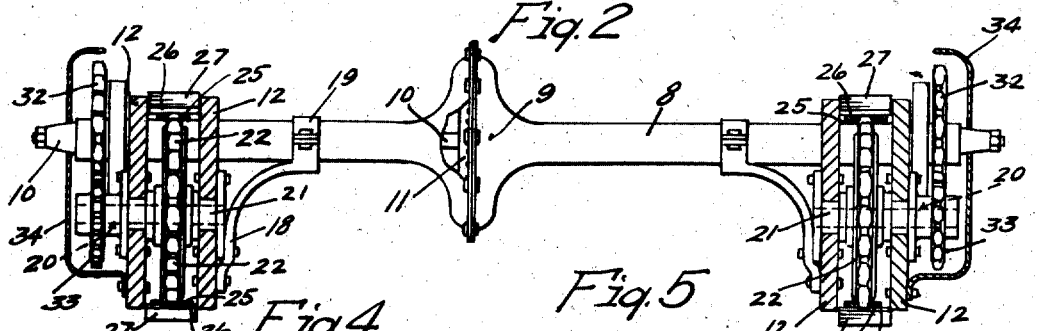
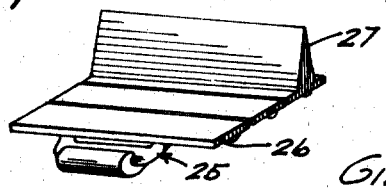
WITNESSES
E. C. Wells
H. D. Kilgore
INVENTOR
Gilbert Tollefson
BY HIS ATTORNEYS
Williamson Merchant

UNITED STATES PATENT OFFICE.

GILBERT TOLLEFSON, OF BAGLEY, MINNESOTA.

RUNNER ATTACHMENT FOR MOTOR-DRIVEN VEHICLES.

1,275,797.　　　Specification of Letters Patent.　　Patented Aug. 13, 1918.

Application filed March 9, 1918. Serial No. 221,345.

*To all whom it may concern:*

Be it known that I, GILBERT TOLLEFSON, a citizen of the United States, residing at Bagley, in the county of Clearwater and State of Minnesota, have invented certain new and useful Improvements in Runner Attachments for Motor-Driven Vehicles; and I do hereby declare the following to be a full, clear, and exact description of the invention, such as will enable others skilled in the art to which it appertains to make and use the same.

My invention has for its object to provide extremely simple and highly efficient runner attachments for motor driven vehicles, to take the place of the customary driving or traction wheels thereof, whereby the vehicle may be easily propelled over ice or snow covered roads.

To the above end, the invention consists of the novel devices and combinations of devices hereinafter described and defined in the claims.

In the accompanying drawings, which illustrate the invention, like characters indicate like parts throughout the several views.

Referring to the drawings:

Figure 1 is a side elevation of an automobile having the invention applied thereto, some parts being broken away;

Fig. 2 is a view partly in rear elevation and partly in transverse vertical section, taken on the line 2—2 of Fig. 1, on an enlarged scale;

Fig. 3 is a longitudinal section, taken on the line 3—3 of Fig. 2, with the exposed parts shown in full;

Fig. 4 is a detail view in section, taken on the line 4—4 of Fig. 3; and

Fig. 5 is an enlarged perspective view of a portion of one of the traction belts.

Of the parts of the automobile illustrated for the purpose of showing the invention applied in working position, it is only necessary to note the body 6, front wheels 7, rear axle casing and differential housing 8 and 9, respectively, rear axle structure 10, and differential gear mechanism 11. The rear driving wheels of the vehicle are removed, and in place thereof, are substituted two runner attachments, which are the subject matter of my present invention.

The runner attachments are identical, the one with the other, and the description of the one will suffice for the other. Each runner attachment comprises a pair of laterally spaced shoes 12, having curved front and rear ends, so as to travel freely over a road-bed during either a forward or backward movement of the vehicle to which they are attached. These shoes 12 are rigidly connected and held laterally spaced, as shown, by four horizontally spaced upper bolts and coöperating thimbles 13, and two horizontally spaced lower bolts and coöperating thimbles 14.

The shoes 12 are provided, at their intermediate portions, with transverse notches 15, to receive half bearings 16, rigidly secured to said shoes. These half bearings 16 receive and hold the respective end of the rear axle casing 8, and coöperating straps 17, secured to said half bearings, hold said end of the axle casing in the half bearings. Obviously, the bearings 16 and coöperating straps 17 connect the shoes 12 to the rear axle casing 8, with freedom for vertical oscillatory movement. A bracket 18, rigidly secured to the innermost shoes 12 and connected to the casing 8 by a two part sleeve bearing 19, affords a brace to hold the runner attachment against lateral twisting movement with respect to the casing 8, but with freedom for vertical oscillatory movement with respect thereto.

A transverse spindle 20 is journaled in bearings 21, secured in the rear end portions of the shoes 12. Secured for rotation with the spindle 20 is a relatively large sprocket wheel 22, centrally located between the shoes 12. A horizontal frame 23, having bifurcated ends, has its rear prongs pivoted to the spindle 20 on each side of the sprocket wheel 22, and connects said frame thereto for vertical oscillatory movement. An idle sprocket 24 is journaled to and between the front prongs of the frame 23.

A traction belt is arranged to run over the alined sprocket wheels 22 and 24, and, is shown, comprises a sprocket chain 25, having, integral with each link thereof, a flat traction plate 26. These traction plates 26 extend approximately the full width between the shoes 12, with just enough clearance to travel freely. The longitudinal edges of adjacent traction plates 26 are set close together, as best shown in Fig. 5, and integral with certain of said traction plates are formed calks 27.

The lower run of the traction belt is held straight between the sprocket wheels 22 and 24 by a presser bar 28, comprising two laterally spaced members rigidly secured to and suspended from the frame 23 by uprights 29. The members of the presser bar 28 are arranged to engage the plates 26, near their ends, or, in other words, close to the shoes 12, with the sprocket chain 25 extending therebetween. An anti-friction bearing 30, in the form of an idle sprocket, is provided for the traction belt. This sprocket wheel 30 is journaled to the members of the presser bar 28, centrally between the sprocket wheels 22 and 24, and the sprocket chain 25 runs thereunder, as shown in Fig. 3. The sprocket wheel 30 not only prevents the traction belt from dragging too heavily over the presser bar 28, but assists said presser bar in holding the traction belt onto the road-bed.

The ends of the members of the presser bar 28 are beveled, and when the sprocket wheel 24 is in its uppermost position, engage the connections 14 as stops, to limit the upward oscillatory movement of the frame 23. When the presser bar 28 engages the stops 14, the road-engaging face of the traction belt is held in the plane of the road-engaging surfaces of the shoes 12. In this position of the traction belt only the calks 27 project below the shoes 12.

The traction belts are driven to propel the vehicle either forward or backward by sprocket chains 31, arranged to run over relatively large sprocket wheels 32 and relatively small sprocket wheels 33. The sprocket wheels 32 are secured to the journals of the rear axle structure 10, in place of the rear wheels, and the sprocket wheels 33 are keyed to the spindles 20. A sheet metal casing is secured to the outermost shoe 12 of each runner, for the sprocket chain 31, and sprocket wheels 32 and 33, and is indicated by the numeral 34.

In applying the runner attachments to a motor driven vehicle the floating ends of the frame 23 are extended forward, and leaf springs 35 are provided for yieldingly holding the same down. These springs 35 are anchored to the intermediate connections 13, rearward of the axle 10, extend under tie rods 36, secured to the shoes 12, with their free ends bearing upon the frames 23, forward of said axle. When the runner attachments are traveling on light snow the springs 35 will press the frames 23 downward and thereby cause the traction belts to pack the snow, and thereby give a firm hold for the calks 27. On hard roads the weight of the traction belts will overcome the springs 35 so that only the calks project below the shoes 12 and into the road-bed.

From the above description it is evident that the runner attachments may be very easily and quickly substituted for the rear wheels of a motor driven vehicle, thereby adapting the same for use on ice or snow covered roads. On the other hand, the runner attachments may be very easily and quickly removed and the rear wheels substituted therefor, adapting the vehicle for use on dirt roads. By securing the sprocket wheels 32 to the journals of the rear axle structure 10, the traction belts are driven in the same manner as the removed rear wheels of the vehicle. Also, the differential gear mechanism permits one of the runners to travel at a different speed from the other thereof.

What I claim is:

1. The combination with a vehicle having a motor driven axle and a casing therefor, of a pair of runners supporting said casing and intermediately secured thereto for vertical oscillatory movement, each of said runners comprising a pair of shoes, a wheel journaled to the shoes, a vertical oscillatory frame pivoted to the shoes at the axis of its wheel, a second wheel journaled to the free end of the frame, a traction belt arranged to run over said two wheels, and connections for driving the first noted wheel from one of the journals of the axle.

2. The combination with a vehicle having a motor driven axle and a casing therefor, of a pair of runners supporting said casing and intermediately secured thereto for vertical oscillatory movement, each of said runners comprising a pair of shoes, a wheel journaled to the shoes, a vertical oscillatory frame pivoted to the shoes at the axis of its wheel, a second wheel journaled to the free end of the frame, a traction belt arranged to run over said two wheels, a stop limiting the raising movement of the free end of the frame, whereby the lower run of the traction belt will travel approximately in the plane of the road engaging surfaces of the shoes, and connections for driving the first noted wheel from one of the journals of the axle.

3. The combination with a vehicle having a motor driven axle and a casing therefor, of a pair of runners supporting said casing and intermediately secured thereto for vertical oscillatory movement, each of said runners comprising a pair of shoes, a wheel journaled to the shoes, a vertical oscillatory frame pivoted to the shoes at the axis of its wheel, a second wheel journaled to the free end of the frame, a traction belt arranged to run over said two wheels, a stop limiting the raising movement of the free end of the frame, whereby the lower run of the traction belt will travel approximately in the plane of the road engaging surface of the shoes, a spring under strain to move the free end of the frame downward, and connections for driving the first noted wheel from one of the journals of the axle.

4. The combination with a vehicle having a motor driven axle and a casing therefor, of a pair of runners supporting said casing and intermediately secured thereto for vertical oscillatory movement, each of said runners comprising a pair of shoes, a wheel journaled to the shoes, a vertical oscillatory frame pivoted to the shoes at the axis of its wheel, a second wheel journaled to the free end of the frame, a traction belt arranged to run over said two wheels, a presser bar carried by the frame and operative on the lower run of the traction belt, and connections for driving the first noted wheel from one of the journals of the axle.

5. The combination with a vehicle having a motor driven axle and a casing therefor, of a pair of runners supporting said casing and intermediately secured thereto for vertical oscillatory movement, each of said runners comprising a pair of shoes, a wheel journaled to the shoes, a vertical oscillatory frame pivoted to the shoes at the axis of its wheel, a second wheel journaled to the free end of the frame, a traction belt arranged to run over said two wheels, a presser bar carried by the frame and operative on the lower run of the traction belt, an anti-friction bearing for the traction belt and carried by the presser bar, and connections for driving the first noted wheel from one of the journals of the axle.

6. The combination with a vehicle having a motor driven axle and a casing therefor, of a pair of runners supporting said casing and intermediately secured thereto for vertical oscillatory movement, each of said runners comprising a pair of shoes, a wheel journaled to the shoes, a vertical oscillatory frame pivoted to the shoes at the axis of its wheel, a second wheel journaled to the free end of the frame, a traction belt arranged to run over said two wheels, a presser bar carried by the frame and operative on the lower run of the traction belt, stops holding the presser bar, when in its uppermost position, with its lower longitudinal edge approximately parallel to the road engaging surfaces of the shoes, and connections for driving the first noted wheel from one of the journals of the axle.

7. The combination with a vehicle having a motor driven axle and a casing therefor, of a pair of runners supporting said casing and intermediately secured thereto for vertical oscillatory movement, each of said runners comprising a pair of rigidly connected and laterally spaced shoes, a wheel journaled to said shoes, a vertical oscillatory frame pivoted to the shoes at the axis of its wheel, a second wheel journaled to the free end of the frame, a link belt arranged to run over said two wheels, each of said links having a traction plate which extends approximately the full width between the shoes, the traction plates of adjacent links being closely positioned, and connections for driving the first noted wheel from one of the journals of the axle.

8. The combination with a vehicle having a motor driven axle and a casing therefor, of a pair of runners supporting said casing and intermediately secured thereto for vertical oscillatory movement, each of said runners comprising a pair of rigidly connected and laterally spaced shoes, a wheel journaled to said shoes, a vertical oscillatory frame pivoted to the shoes at the axis of its wheel, a second wheel journaled to the free end of the frame, a link belt arranged to run over said two wheels, each of said links having a traction plate which extends approximately the full width between the shoes, the traction plates of adjacent links being closely positioned, calks on certain of the traction plates, and connections for driving the first noted wheel from one of the journals of the axle.

In testimony whereof I affix my signature in presence of two witnesses.

GILBERT TOLLEFSON.

Witnesses:
A. J. PEDERSON,
ACQUINA KOLB.